(12) United States Patent
Oldorff et al.

(10) Patent No.: US 8,092,865 B2
(45) Date of Patent: Jan. 10, 2012

(54) METHOD FOR THE PRODUCTION OF A BUILDING BOARD AND BUILDING BOARD PRODUCED ACCORDING TO THE METHOD

(75) Inventors: Frank Oldorff, Schwerin (DE); Norbert Kalwa, Horn-Bad Meinberg (DE)

(73) Assignee: Flooring Technologies Ltd., Pieta (MT)

( * ) Notice: Subject to any disclaimer, the term of this patent is extended or adjusted under 35 U.S.C. 154(b) by 797 days.

(21) Appl. No.: 11/869,343

(22) Filed: Oct. 9, 2007

(65) Prior Publication Data
US 2009/0239027 A1    Sep. 24, 2009

(30) Foreign Application Priority Data

Oct. 12, 2006  (DE) .......................... 10 2006 048 735

(51) Int. Cl.
*B05D 3/02* (2006.01)
*B05D 3/12* (2006.01)

(52) U.S. Cl. ........... 427/369; 52/309.4; 156/78; 156/79; 156/83; 156/219; 156/220; 427/262; 427/365; 427/366; 427/370; 427/373; 427/393; 428/158; 428/160; 428/411.1; 428/425.1

(58) Field of Classification Search .................. 427/331, 427/355, 369–373, 389.9, 391–393, 397; 52/309.1, 309.4–309.6, 588.1; 156/78, 79, 156/83, 219, 220; 428/98–99, 156–160, 428/411.1, 423.1
See application file for complete search history.

(56) References Cited

U.S. PATENT DOCUMENTS

| | | | | |
|---|---|---|---|---|
| 3,912,569 A | * | 10/1975 | Kapral | 156/230 |
| 4,623,584 A | * | 11/1986 | Masui et al. | 428/304.4 |
| 5,744,504 A | * | 4/1998 | Oishi et al. | 521/50 |
| 5,763,048 A | * | 6/1998 | Takahashi | 428/147 |
| 6,844,055 B1 | * | 1/2005 | Grinshpun et al. | 428/304.4 |
| 2002/0025751 A1 | * | 2/2002 | Chen et al. | 442/324 |
| 2002/0160680 A1 | * | 10/2002 | Laurence et al. | 442/394 |
| 2003/0187086 A1 | * | 10/2003 | Nutt et al. | 521/50 |
| 2005/0112335 A1 | * | 5/2005 | Schitter | 428/195.1 |

FOREIGN PATENT DOCUMENTS

| | | | |
|---|---|---|---|
| CH | 345154 | | 3/1960 |
| DE | 1224482 B | * | 9/1966 |
| DE | 3405231 | | 2/1984 |
| DE | 10034407 | | 7/2000 |
| DE | 20200235 | | 1/2002 |
| DE | 10252863 | | 11/2002 |
| DE | 10329728 A1 | * | 1/2005 |
| DE | 102004056540 | | 5/2006 |
| JP | 52100714 A | * | 8/1977 |

* cited by examiner

*Primary Examiner* — Michael Cleveland
*Assistant Examiner* — Alexander Weddle
(74) *Attorney, Agent, or Firm* — Andrew M. Calderon; Roberts Mlotkowski Safran & Cole, P.C.

(57) ABSTRACT

A method for producing a building board. The method includes applying synthetic-resin layers to the top side and/or the bottom side of a support board made of a wood material or a mixture of wood material and plastic. The layered structure is compressed under the impact of pressure and temperature. At least one of the synthetic-resin layers expands during compressing.

33 Claims, 3 Drawing Sheets

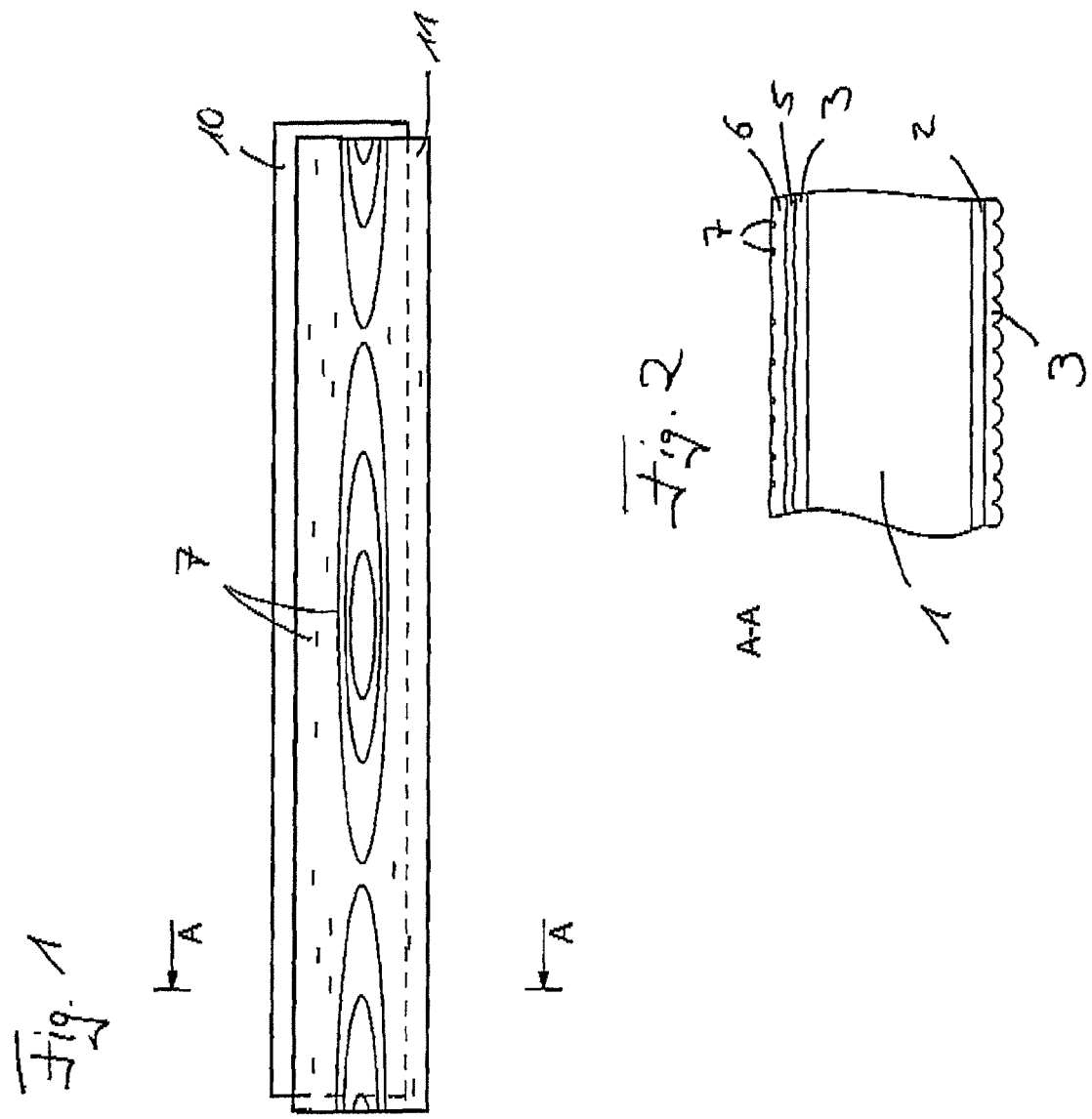

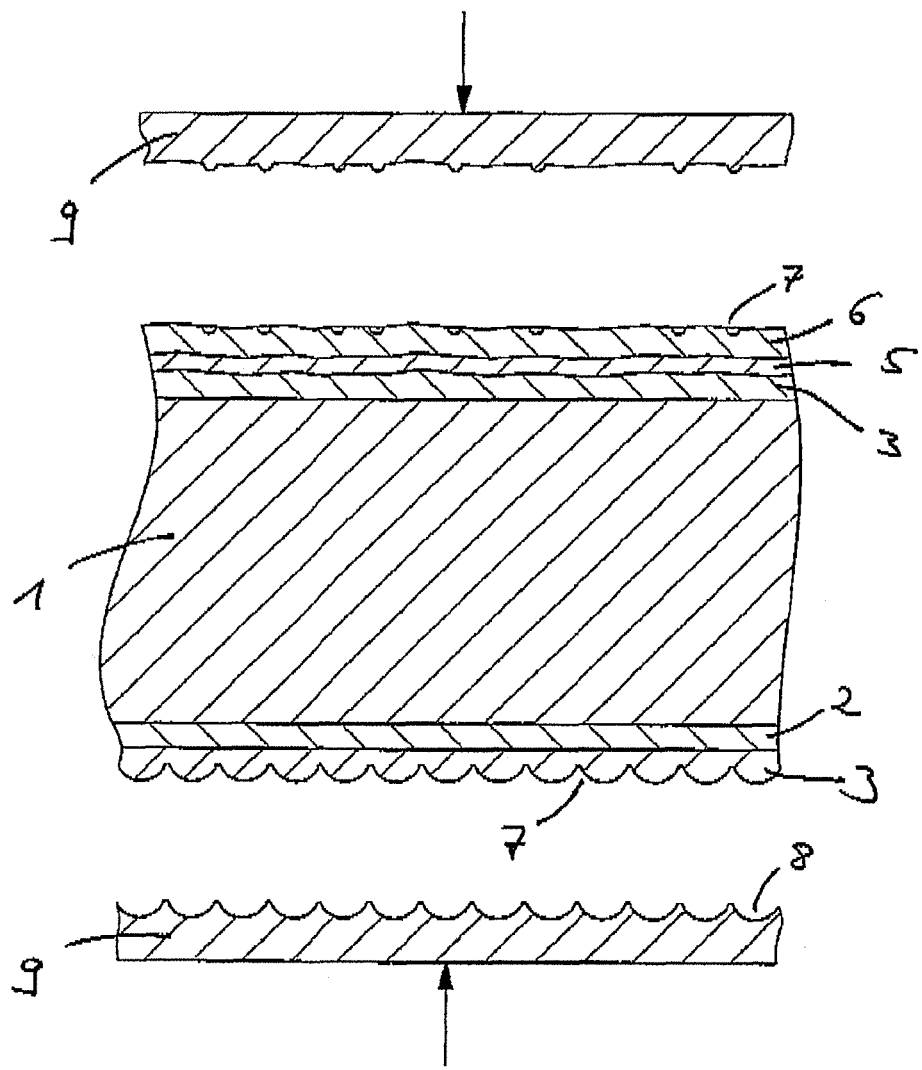

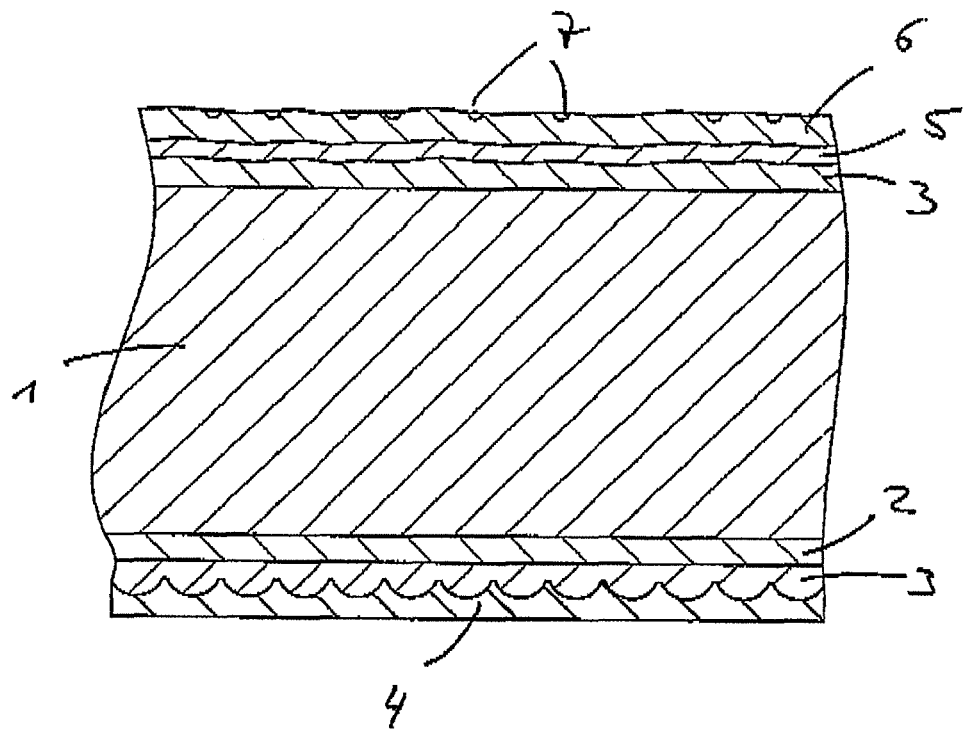

METHOD FOR THE PRODUCTION OF A BUILDING BOARD AND BUILDING BOARD PRODUCED ACCORDING TO THE METHOD

CROSS REFERENCE TO RELATED APPLICATION

The present application claims priority under 35 USC §119 to German Application No. 10 2006 048 735.4, filed on Oct. 12, 2006, the contents of which are incorporated herein by reference in their entirety.

BACKGROUND OF THE INVENTION

1. Field of the Invention

The invention refers to a method for producing a building board, wherein synthetic-resin layers are applied to the top side and/or the bottom side of a support board made of a wood material or a mixture of wood material and plastic, and the layered structure is compressed under the impact of pressure and temperature, as well as a building board produced according to this method.

2. Discussion of Background Information

A method of producing a building board is shown, e.g., from DE 102 52 861 A1. For example, flooring panels, which are widely used as a substitute for parquet flooring, are manufactured from building boards produced according to a method shown in DE 102 52 861 A1.

It is disadvantageous that, because of its structure and the gross density of the support board, a floor covering of such rigidity offers little comfort in terms of sound insulation and sound damping when someone walks on it. It is thus known to lay a floor covering, e.g., on a base of foam mats or elastic used floor coverings such as, e.g., short-pile carpets. But this is problematic with carpets or used floor coverings because of the installation height, and it is not free of expenditure because of the additional work of laying and fixing a foam mat.

Impact sound is produced through reflections of shock waves introduced into the floor when someone walks on it. In order to reduce these reflections, it is known, e.g., from DE 202 00 235 U1 to apply onto a building board a structured sound-insulating layer connected to the bottom side of the core. The structuring reduces the sound pressure values when someone walks on the floor, and the pertinent frequencies are shifted into a lower range.

The formation of the structure must either be taken into account when the thermoplastic material is brushed on or must be produced subsequently by heating or plasticizing areas of the thermoplastic material.

A counteracting impregnant for laminate floor panels is known from DE 10 2004 056 540 A1. The impregnant is composed of a resin-impregnated base paper onto one side of which a sound-insulating material layer is glued. Disadvantages are, on the one hand, the high costs of the paper ply forming the base of the counteracting impregnant and, on the other hand, that a counteracting impregnant of this type can be processed only in presses that are provided with a feeder of paper plies. Counteracting impregnants of this type cannot be used in integrated installations that print support boards directly and subsequently compress them.

The impact-sound insulation of a floor covering is certainly of great importance. For a person walking on a floor covering, however, the room sound is much more objectionable. The room sound is composed of the sound waves that are reflected directly or indirectly when someone walks on the floor.

From DE 100 34 407 C1 a laminate panel is known that is characterized by an insulating layer attached to the bottom side of the panel by means of strip gluing. The insulating layer is embodied shorter than the panel in the longitudinal and transverse directions. Since the insulating layer is embodied to be shorter than the panel, after the laying of the panels, air cushions arise both in the longitudinal and the transverse direction between each of the insulating layers of each panel. The cushions substantially increase the sound insulation, as the sound cannot be transferred beyond the panel joint since a compression of the insulating layer is largely avoided. This greatly reduces the room sound. Here, as well, the disadvantages are that a floor panel of this type cannot be produced in integrated installations, and the increased production expenditure through the additional work steps of applying the glue and the insulating layer.

SUMMARY OF THE INVENTION

The invention is based on improving a generic method for producing a building board in that, on the one hand, the weight is reduced while maintaining the outer dimensions and, on the other hand, the insulating and/or damping properties of the building board can be varied. To solve the problem, the generic method is characterized in that at least one of the synthetic-resin layers expands during compressing.

If an expandable layer is applied to the top side of the core, a building board produced in this manner substantially dampens the impact sound when someone walks on a floor built of these building boards. The floor covering is able to convert the impact energy into compression work. This substantially reduces the sound waves emitted into the floor, so that fewer sound waves can be reflected as well. A person walking on the floor covering thus perceives the walking to be considerably more pleasant, because it is quieter. This embodiment offers the additional advantage that the normally cold impression of a floor produced of building boards is improved. The floor becomes softer, warmer and more elastic, so that even walking on it barefoot is perceived to be considerably more pleasant. This is advantageous in particular for laying in children's rooms, as children generally tend to lie, sit or run barefoot on the floor.

If the expandable layer is applied to the bottom side of the core, the impact sound is dampened, as a damping layer is produced between the wood material core and the floor lying underneath the floor covering. By compressing this layer with the core, a good and permanent connection with the building board is produced. It is also conceivable to apply only a single layer and only to the bottom side. In all cases, the method can also be used in integrated installations, because the layer can be brushed or rolled onto the core of the support board directly.

Advantageously, an expandable layer is applied both to the top side and to the bottom side of the core. The two effects described above complement one another and both room sound and impact sound are considerably reduced.

In addition to the effects mentioned, there is a considerable weight saving with a building board produced according to this method, as the expandable layer has a relatively high gas proportion and is thus very light.

Preferably, the expandable synthetic-resin layer is made of a mixture of urea resin and/or melamine resin and/or phenolic resin. Advantageously, at least one foaming additive is added to this layer, the gas proportion of which additive increases under the impact of pressure and/or temperature. The layer foams because of the rising gas proportion during compressing. As the volume thereby increases while the mass remains the same, the density of the layer decreases. But the expandable layer can also be made of a foaming polyurethane.

The foaming additive may contain a substance that disintegrates at least in part with a temperature increase, producing a decomposition gas. For example, azodicarbonamide has proven to be suitable for this application. The decomposition gases produced during disintegration cause the foaming effect.

Alternatively, the additive may also contain a proportion of gas-filled microcapsules that expand with a temperature increase. These microcapsules may be for instance spherical capsules composed of a polymer, which capsules are filled with pentane. Products by Schönox, e.g., the product "Expancel®," are also suitable for this use.

The amount of the additive added to the expandable layer is preferably between 1% and 15% with reference to the weight of the expandable layer.

Depending on the amount of synthetic resin applied and the amount of foaming agent added, increases in layer thickness of up to 0.5 mm or 6.5% with reference to an 8 mm HDF board can be achieved. The foaming agents added do not change the storage stability of the coated panels. The foaming process does not take place until the product is coated in the short-cycle press. Intermediate drying steps taking place before that, during the process, do not influence the foaming agent. The foaming process requires temperatures above 140° C.

Furthermore, various fillers can be added to the expandable layer. Advantageously, at least one filler increasing elasticity is added to the layer, preferably cellulose fibers. The amount of the filler increasing elasticity is advantageously 1% to 5% with reference to the weight of the expandable layer.

At least one filler increasing density can be added to the expandable layer. Chalk or ground marble have proven to be suitable. The amount of the filler increasing density is advantageously 1% to 20% with reference to the weight of the expandable layer.

At least one filler increasing electrical conductivity can be added to the expandable layer in order to prevent an electrostatic charging of the building board. For example, carbon or carbon compounds are suitable for this. The amount of the filler increasing electrical conductivity is advantageously 1% to 10% with reference to the weight of the expandable layer.

It has proven to be particularly advantageous that the expandable layer can be applied by spraying or rolling, which renders possible a use of the method in integrated installations. Preferably, the weight of the expandable layer after the application is between 50 g/m$^2$ and 150 g/m$^2$.

Before the next work step the expandable layer is dried back to a residual moisture between 4% and 8%.

Indentations can be provided in the pressing plate or plates used during compressing, into which indentations at least parts of the expandable layer expand during compressing, thus forming a structure in the layer being produced. Structures in an expandable layer on the bottom side of the building board improve the sound-insulation properties, since they provide additional hollow spaces and air pockets between a floor covering produced from building boards produced according to the method and the floor located underneath.

After compressing, the layered structure preferably features a visible pattern. This pattern can be embodied in the layered structure as a printed paper ply, or be made of at least one paint layer directly printed onto the layer located underneath. The structure produced during compressing in an expandable layer on the top side of the building board can advantageously correspond to the pattern applied in this manner. In this case it is possible to further improve the optical and haptic properties of the building board and to make it more similar to a real-wood building board.

Advantageously, the layered structure to be compressed comprises an abrasion-resistant ply transparent after compressing. The ply is located on top of the pattern. This ply can be made, e.g., of a synthetic-resin layer to which abrasion-resistant particles, e.g., corundum, have been added. Preferably, the abrasion-resistant ply has a surface structure. It is advantageous if the surface structure of the abrasion-resistant ply is coordinated with the pattern used on and/or with the structure of the expandable layer. Advantageously, the surface structure of the abrasion-resistant ply forms predominantly indentations, and the surface structure of the expandable layer forms predominantly projections. The abrasion-resistant ply is preferably paper-free and applied essentially in liquid form.

Preferably, the expandable layer is covered by a cover layer. This layer protects the expandable layer during handling in production and use and, at the same time, has a stabilizing function. Advantageously, the application amount of this cover layer is between 15 g/m$^2$ and 50 g/m$^2$. After having been applied, the layer is dried back to a residual moisture of 4% to 6.5%.

Preferably, the surface structure has elongated projections, since a particularly large surface enlargement can thus be produced.

The layered structure to be compressed preferably comprises a counteracting ply applied onto the bottom side of the support board. Strong tensile forces act on the support board because of the layers applied to the top side of the support board, which forces may lead to a concave deformation. The counteracting ply offsets these tensile forces. Advantageously, the counteracting ply can be embodied as a paint layer applied directly to the support board. The paint layer is composed of at least one paint coat.

A building board, in particular a floor panel, produced according to the method is characterized in that glue-less layers are applied to the top side and/or the bottom side of the support board. At least one of the layers is embodied as a foamed layer. Preferably, building boards of this type are provided on their side edges with connecting elements such as, e.g., groove/tongue connections with which identical building boards can be connected. These connecting elements can also be provided with locking elements that can prevent a movement of connected building boards relative to one another in the direction of the plane formed by them and perpendicular thereto.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 shows a top view of a building board;

FIG. 2 shows a first embodiment of the building board in partial cross section;

FIG. 3 shows a diagrammatic view of a short-cycle press with the building board to be compressed in partial cross section; and FIG. 4 shows a second embodiment of the building board in partial cross section.

DETAILED DESCRIPTION OF THE PRESENT INVENTION

FIG. 1 shows a top view of a building board used as a floor panel. The surface structure 7 is discernible, which in this case imitates the structure of a real-wood pattern. The side edges of the building board are equipped with groove 10 and tongue 11, which are equipped with locking elements, so that several identical building boards can be connected to and locked with one another.

FIG. 2 shows a cross section along the line A-A from FIG. 1. The building board has a support board 1. An expandable layer 3 is applied to the top side of the support board 1. The expandable layer 3 is covered by a pattern layer 5 and an abrasion-resistant ply 6. The structure 7 is embossed into the top side of the abrasion-resistant ply 6 during compressing. It is thus rendered possible to approximate the optical and haptic impression of the building board to that of a real-wood panel. A counteracting ply 2 is applied to the bottom side of the support board 1. This counteracting ply prevents the tension produced by the layers applied to the top side of the support board 1 from deforming the building board in a concave manner. A further expandable layer 3 is applied on the bottom side of the counteracting ply 2. During compressing, a structure 7 can be introduced into the expandable layer 3 on the bottom side of the counteracting ply 2. If a building board of this type is used, e.g., as a floor covering, the structure 7 generates additional hollow spaces between the floor covering and the floor located underneath it. These hollow spaces create air pockets that, on the one hand, ensure a better thermal insulation and, on the other hand, greatly improve the sound properties of the floor covering.

FIG. 3 shows a diagrammatic representation of a short-cycle press with the two pressing plates 9 and the building board to be compressed lying between them. This building board is again composed of a support board 1, to the bottom side of which the counteracting ply 2 and an expandable layer 3 are applied. During compressing, the expandable layer 3 on the bottom side of the counteracting ply 2 expands into the indentations 8 provided in the bottom pressing plate 9. An expandable layer 3 is applied to the top side of the support board, which layer already clearly shows a surface structure. The pattern layer 5 located above the expandable layer 3 is covered by an abrasion-resistant ply 6. During compressing, structures 7 are embossed into the abrasion-resistant ply 6 by the top pressing plate 9.

FIG. 4 shows a partial cross section through a building board, as already shown in FIG. 2. In FIG. 4, however, the expandable layer 3 applied to the bottom side of the counteracting ply 2 is covered by an additional cover layer 4. This cover layer 4 stabilizes the structure in the expandable layer 3 and protects it during handling in production and transport.

The invention claimed is:

1. A method for producing a building board, comprising:
applying synthetic-resin layers to at least one of a top side and a bottom side of a support board made of a wood material or a mixture of wood material and plastic to form a layered structure; and
compressing the layered structure under pressure and temperature using a pressing plate having a plurality of indentations, such that at least one of the synthetic-resin layers expands by foaming during the compressing into the plurality of indentations to form a structure in the layered structure.

2. The method according to claim 1, wherein the at least one of the synthetic-resin layers which expands is made of a foaming polyurethane.

3. The method according to claim 1, wherein the at least one of the synthetic-resin layers which expands is made of a mixture of at least one of urea resin and melamine resin and phenolic resin.

4. The method according to claim 3, further comprising adding at least one foaming additive to the at least one of the synthetic-resin layers which expands, wherein a gas of the at least one foaming additive increases under at least pressure and temperature.

5. The method according to claim 4, wherein the at least one foaming additive contains one of:
at least one substance that disintegrates at least in part with a temperature increase, producing a decomposition gas; and
a proportion of gas-filled microcapsules, which expand with a temperature increase.

6. The method according to claim 4, wherein an amount of the at least one foaming additive is between 1% and 15% with reference to a weight of the at least one of the synthetic-resin layers which expands.

7. The method according to claim 1, further comprising adding at least one filler which increases one of:
elasticity to the at least one of the synthetic-resin layers which expands;
density to the at least one of the synthetic-resin layers which expands; and
electrical conductivity to the at least one of the synthetic-resin layers which expands.

8. The method according to claim 7, wherein:
cellulose fibers are used as the filler to increase the elasticity;
chalk or ground marble are used as the filler to increase the density; and
carbon or carbon compounds are used as the filler to increase the electrical conductivity.

9. The method according to claim 7 wherein:
an amount of the at least one filler which increases the elasticity is 1% to 5% with reference to a weight of the at least one of the synthetic-resin layers which expands;
an amount of the at least one filler which increases the density is 1% to 20% with reference to the weight of the at least one of the synthetic-resin layers which expands; and
an amount of the at least one filler which increases the electrical conductivity is 1% to 10% with reference to the weight of the at least one of the synthetic-resin layers which expands.

10. The method according to claim 1, further comprising spraying or rolling the at least one of the synthetic-resin layers which expands.

11. The method according to claim 1, wherein one of:
a weight of the at least one of the synthetic-resin layers which expands after application is between 50 and 150 g/m$^2$; and
a moisture of the at least one of the synthetic-resin layers which expands after the application is adjusted to be 4% to 8%.

12. The method according to claim 1, wherein the layered structure to be compressed comprises a pattern visible after the compressing.

13. The method according to claim 12, wherein the pattern is embodied as a printed paper ply or as a directly printed ply made of at least one at least partly colored layer.

14. The method according to claim 1, wherein the layered structure to be compressed comprises an abrasion-resistant ply, transparent after the compressing, on top of a pattern.

15. The method according to claim 14, wherein the abrasion-resistant ply is embodied as a synthetic-resin layer, provided with abrasion-resistant particles, on top of the pattern layer.

16. The method according to claim 14, wherein the abrasion-resistant ply has a surface structure.

17. The method according to claim 16, wherein the surface structure of the abrasion-resistant ply is coordinated with at least one of the pattern and the surface structure of the at least one of the synthetic-resin layers which expands.

18. The method according to claim 16, wherein the surface structure of the abrasion-resistant ply embodies predominantly indentations, and the surface structure of the at least one of the synthetic-resin layers which expands embodies predominantly projections.

19. The method according to claim 14, wherein the abrasion-resistant ply is paper-free and applied essentially in liquid form.

20. The method according to claim 1, further comprising covering the at least one of the synthetic-resin layers which expands with a cover layer.

21. The method according to claim 20, wherein an application amount of the cover layer is between 15 and 50 g/m$^2$.

22. The method according to claim 20, further comprising drying the cover layer to a residual moisture of 4% to 6.5% before a next work step.

23. The method according to claim 1, further comprising applying a counteracting ply to a bottom side of the support board.

24. The method according to claim 1, further comprising adding:
   elasticity to the at least one of the synthetic-resin layers which expands;
   density to the at least one of the synthetic-resin layers which expands; and
   electrical conductivity to the at least one of the synthetic-resin layers which expands; wherein:
   cellulose fibers are used as the filler to increase the elasticity;
   chalk or ground marble are used as the filler to increase the density; and
   carbon or carbon compounds are used as the filler to increase the electrical conductivity.

25. The method according to claim 24, further comprising:
   covering the at least one of the synthetic-resin layers which expands with a cover layer; and
   drying the cover layer to a residual moisture of 4% to 6.5% before a next work step, wherein an application amount of the cover layer is between 15 and 50 g/m$^2$.

26. The method according to claim 1, wherein the compressing causes an increase in layer thickness of up to 0.5 mm or 6.5% with reference to an 8 mm HDF board.

27. The method according to claim 1, wherein the expanding is a foaming process that takes place only after the building board is coated in a short-cycle press, wherein intermediate drying steps take place before the foaming process.

28. The method according to claim 27, wherein the foaming process requires temperatures above 140° C.

29. The method according to claim 28, wherein the synthetic-resin layers include an expandable layer, and prior to the compressing into the plurality of indentations to form a structure, the expandable layer is dried back to a residual moisture between 4% and 8%.

30. The method according to claim 29, further comprising providing an abrasion resistant ply on the expandable layer, wherein a surface structure of the abrasion resistant ply is coordinated with the structure on the expandable layer.

31. The method according to claim 29, wherein the surface structure of an abrasion resistant ply forms predominantly indentations and the structure on the expandable layer forms predominantly projections due to the indentations in the pressing plate.

32. A method for producing a building board, comprising:
   applying synthetic-resin layers to at least one of a top side and a bottom side of a support board made of a wood material or a mixture of wood material and plastic to form a layered structure;
   compressing the layered structure under pressure and temperature using a pressing plate having a plurality of indentations, such that at least one of the synthetic-resin layers expands by foaming during the compressing into the plurality of indentations to form a structure in the layered structure; and
   adding at least one foaming additive to the at least one of the synthetic-resin layers which expands, wherein a gas of the at least one foaming additive increases under at least pressure and temperature, wherein
      the at least one of the synthetic-resin layers which expands is made of a mixture of at least one of urea resin and melamine resin and phenolic resin,
      the at least one foaming additive contains one of:
         at least one substance that disintegrates at least in part with a temperature increase, producing a decomposition gas; and
         a proportion of gas-filled microcapsules, which expand with a temperature increase.

33. The method according to claim 32, wherein an amount of the at least one foaming additive is between 1% and 15% with reference to a weight of the at least one of the synthetic-resin layers which expands.

* * * * *